Jan. 15, 1924.
J. BLACKBURN
1,480,656
ELECTRICAL CONNECTION FOR AUTOMOBILES
Filed Nov. 8, 1919  2 Sheets-Sheet 1
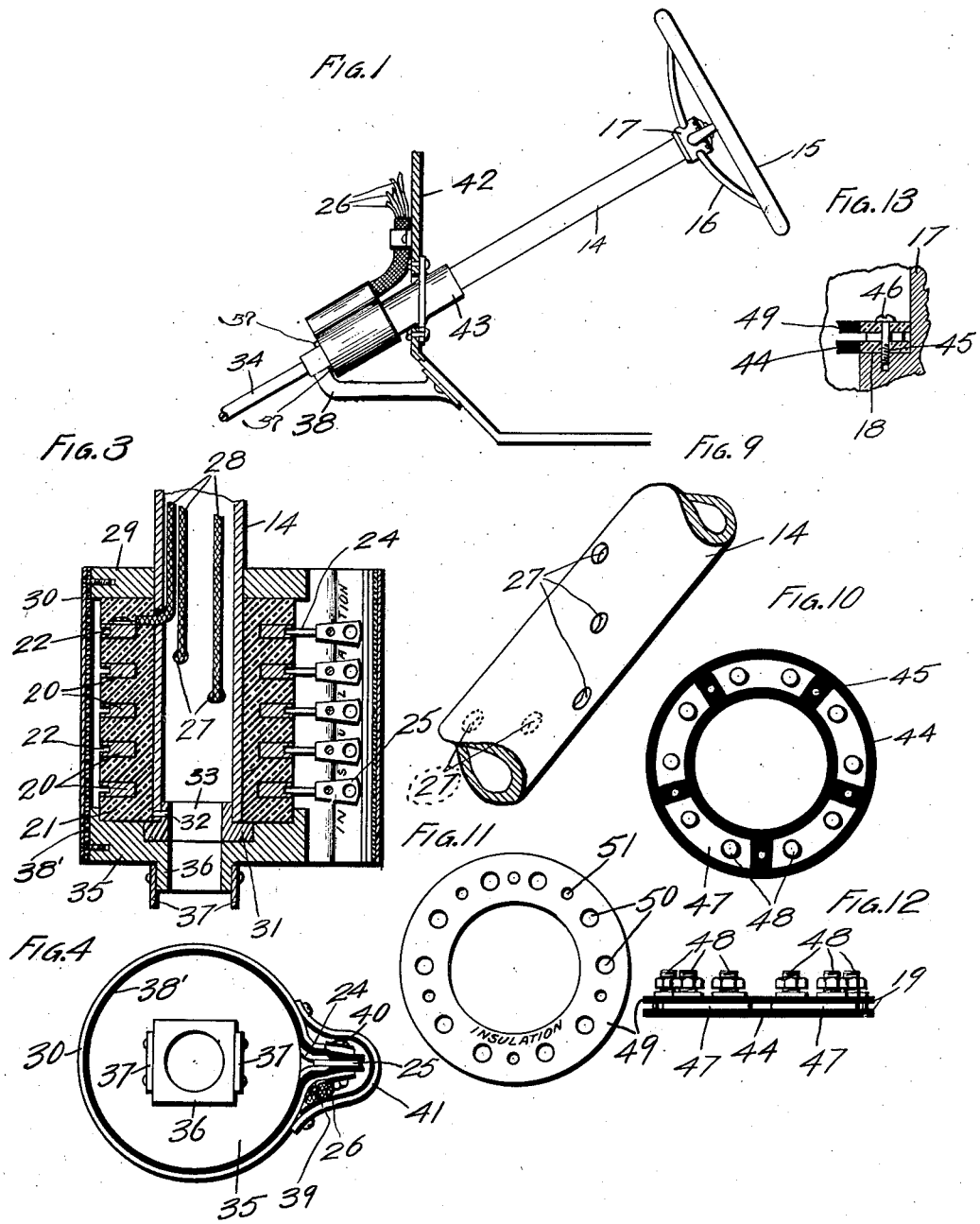
INVENTOR
JASPER BLACKBURN
BY Edward E. Longan
ATTY.

Jan. 15, 1924. 1,480,656
J. BLACKBURN
ELECTRICAL CONNECTION FOR AUTOMOBILES
Filed Nov. 8, 1919 2 Sheets-Sheet 2
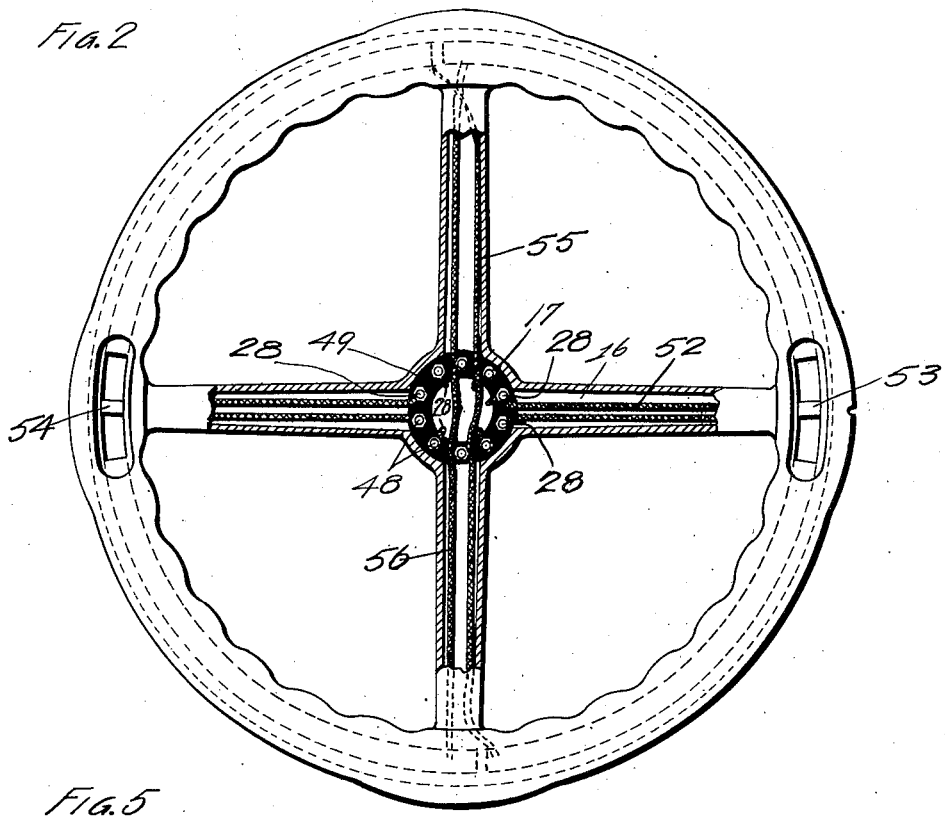
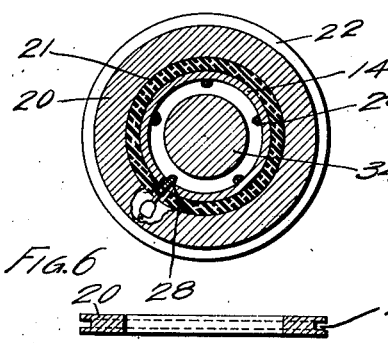
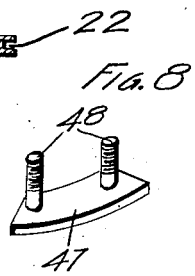
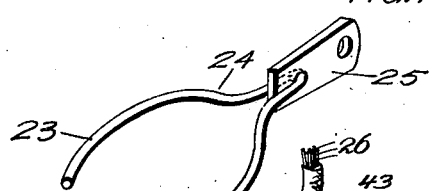
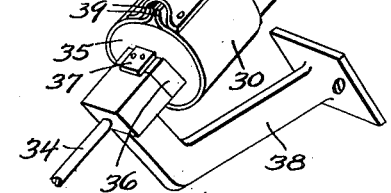
INVENTOR
JASPER BLACKBURN
By Edward E. Longan
ATTY.

Patented Jan. 15, 1924.

1,480,656

UNITED STATES PATENT OFFICE.

JASPER BLACKBURN, OF WEBSTER GROVES, MISSOURI.

ELECTRICAL CONNECTION FOR AUTOMOBILES.

Application filed November 8, 1919. Serial No. 336,763.

*To all whom it may concern:*

Be it known that I, JASPER BLACKBURN, a citizen of the United States of America, and a resident of Webster Groves, county of St. Louis, and State of Missouri, have invented certain new and useful Improvements in Electrical Connections for Automobiles, of which the following is a specification, containing a full, clear, and exact description, references being had to the accompanying drawings, forming a part thereof.

My invention relates to improvements in electrical connections for automobiles, and has for its primary object a steering device having a hollow rotating steering column with a plurality of electric conductors extending through the steering column and attached to contact rings, which rings are secured to the bottom end of the steering column, and the upper ends of the wires being secured to binding posts located within the hollow hub of a steering wheel, which wheel is securely attached to the steering column and steering post.

In the drawings,

Figure 1 is a side elevation of my device as attached to an automobile.

Figure 2 a top view of the steering wheel with parts broken away and in section, showing the terminal or binding posts to which the upper end of the electric conductors are secured.

Figure 3 is an enlarged cross sectional view of the bottom end of the steering column showing the manner in which the wires pass through the steering column and are connected to the contact rings.

Figure 4 a bottom plan view of the housing surrounding the contact rings.

Figure 5 a cross sectional view of one of the contact rings showing it mounted on the steering column and the several wires extending into the steering column in position.

Figure 6 a vertical cross sectional view of one of the contact rings.

Figure 7 a perspective view of one of the sliding terminals made use of.

Figure 8 a perspective view of one of the binding posts made use of for securing the electric conductors within the hub of the steering wheel.

Figure 9 a fragmentary perspective view of the lower end of the steering column showing the openings through which the electric conductors are passed to the interior of the steering column.

Figure 10 a top plan view of the terminal posts and lower insulating plate used in the hub of a steering wheel.

Figure 11 a plan view of the upper insulating plate.

Figure 12 a side elevation of the terminal plug assembled, and

Figure 13 a fragmentary sectional view showing the manner of securing the terminal block within the hollow hub of the steering wheel.

Fig. 14 is a perspective view, showing the housing, brake and bearing for the steering post, and the manner of preventing the rotation of the housing.

In the construction of my device, I employ a hollow steering column 14, to the upper end of which is rigidly secured a steering wheel 15. This wheel has hollow spokes as indicated by the numeral 16, and a chambered hub 17, this chambered hub being provided with a shoulder 18 in which the terminal block 19 is secured.

On the lower end of the steering column 14 I place a series of contact rings 20, these rings being insulated from each other and from the steering column by the insulation 21. These rings are provided on their outside edge with a circumferential groove 22, in which the ends 23 of the sliding terminal 24 fit. Secured to the sliding terminal 24 is a plate 25 to which electrical conductors 26 are fastened, these conductors leading to the various translating devices to be operated.

The steering column 14 is provided near its lower end with a series of openings 27 through which the conductors 28 are passed. These conductors are secured to the rings 20 by soldering as indicated in Figs. 5 and 3. This soldering is done before the insulation is moulded between the rings.

Secured to the steering column and adjacent the uppermost layer of insulation is a ring 29, this ring being revolubly located on the steering post, and to it the upper end of the housing 30 is secured.

The insulation is prevented from slipping off of the steering column by means of a bushing 31. This bushing may be either secured by means of a pin 32 to the steering column or it may be screwed therein.

This bushing is provided with the opening 33 through which the steering post 34 projects. This steering post revolves simultaneously with the column 14, the column carrying the contact rings while the post 34 leads to the steering mechanism.

Surrounding the bushing 31 and of the same diameter as the collar 29 is a second collar 35. The lower end of the housing 30 is secured to this collar. On the bottom face of the collar 35 I form a rectangular projection 36. To this projection are secured plates 37. These plates are adapted to straddle the lower bearing 38, which acts as a support for the shaft 34, and thereby prevent the rotation of the housing 30 when the steering device is operated.

The housing 30 is insulated from the collars 29 and 35 as well as from the terminal plates 25 being lined with a sheet of insulation 38'. The ends of the housing 30 as well as the insulation 38' are bent outwardly as indicated by the numeral 39, and between outwardly bent portions the plates 25 are inserted. Through these plates are inserted binding screws 40 to which the electric conductors 26 are attached. These wires are then gathered together and wrapped with tape so as to form a cable, and over the screws 40 is placed a second insulated housing 41; this housing being secured to the housing 30 by means of screws (see Fig. 4). The object of this second housing is to cover the binding screws so as to prevent tampering therewith and with the lower portion of the electric conductors 26. Immediately above the collar 29 and projecting through the dash 42 of an automobile is the sleeve 43 which acts as a bearing for the steering column; this bearing 43 and the bearing 38 also serving to hold the steering post against any lifting movement, or any downward thrust, in one case the collar 29 preventing the lifting and in the other the bottom bearing 38 preventing the downward thrust.

The terminal plate 19 is composed of a plate of insulation material 44, this plate being solid with the exception of openings 45 through which the screws 46 are passed for securing the block within the hollow hub of the steering wheel. On this plate are placed metallic plates 47, each of which is provided with the upwardly extending binding posts 48.

After these plates have been placed in position, the insulating ring 49 is placed over the posts 48. This ring is provided with the large openings 50 which allow the posts to pass therethrough and with the small openings 51 which will register with the openings 45 so as to allow the screws 46 to pass through both plates and secure the terminal posts together with their insulation tightly together as well as within the hub.

It will also be noted from Figs. 10 and 13 that the plates 47 are of less width than the insulated rings 44 and 49, and that the plates are also spaced apart so as not to touch the screws 46. This eliminates all possibility of a short circuit occurring within the hub.

One of the conductors 28 is attached by means of the binding posts to one of the plates 49, the other binding post being attached to an electrical conductor 52 which is threaded through the hollow spoke of the steering wheel.

This same system is followed for the electric conductors leading from the other contact rings. By this means it is possible to remove the steering wheel from the steering column and post without the necessity of disconnecting the conductors 28 and drawing them entirely through the steering column, it only being necessary in this instance to disconnect five wires and leave the contact rings as well as the various switches as 53 and 54 together with their connections intact. In fact it is unnecessary to even disconnect the conductors 52 unless I desire to take the contact lock 19 apart.

The conductors 28 may also be secured to the rings 20 by means of screws, and the insulating sleeve 21 is preferably moulded in one piece and then forced on to the steering column, although I may construct it of a series of rings and bind it together by means of the collars 29 and 35, but the first mentioned form of construction is preferable, as it saves considerable time in the construction, the conductors 28 also assisting in holding the insulating core 21 against rotation by passing through the openings 27 formed in the steering column.

It will be noted from reference to Fig. 2, that the conductor wires 55 and 56 extend across the opening through which the steering post projects. These wires or conductors are provided with sufficient slack so that they can be pushed aside and not interfere with the insertion of the steering post.

Having fully described my invention, what I claim is:

1. A device of the class described, comprising a rotating steering column, a core of insulating material surrounding the column near its lower end and rotatable therewith, a plurality of spaced apart conductor rings embedded in said core, a collar loosely mounted on the steering column and adjacent each end of the core, an insulated housing secured to said collars and surrounding the core, sliding conductors embracing a portion of said conductor rings carried by said housing and insulated therefrom, and means for holding said housing against rotation.

2. A device of the class described, comprising a rotating steering column, a core of insulating material surrounding said column near its lower end and firmly secured thereto, a plurality of spaced apart peripheral grooved conductor rings embedded in said core, a collar loosely mounted on said steering column at each end of the core, an insulated housing surrounding the core and secured to said collars, sliding conductors carried by said housing, said conductors fitting within the peripheral grooves of the conductor rings and embracing the major portion thereof, and means carried by one of said collars for preventing the rotation of said housing.

In testimony whereof, I have signed my name to this specification in the presence of two subscribing witnesses.

JASPER BLACKBURN.

Witnesses:
E. M. SCHUCHARDT,
WALTER C. STEIN.